US005790784A

United States Patent [19]
Beale et al.

[11] Patent Number: 5,790,784
[45] Date of Patent: Aug. 4, 1998

[54] NETWORK FOR TIME SYNCHRONIZING A DIGITAL INFORMATION PROCESSING SYSTEM WITH RECEIVED DIGITAL INFORMATION

[75] Inventors: Terrance Ralph Beale; Roger Alan McDanell, both of Kokomo, Ind.

[73] Assignee: Delco Electronics Corporation, Kokomo, Ind.

[21] Appl. No.: 570,456

[22] Filed: Dec. 11, 1995

[51] Int. Cl.[6] .................................................. H04L 7/033
[52] U.S. Cl. .................... 395/200.01; 327/156; 370/350; 370/355; 370/478
[58] Field of Search ........................ 370/350, 478, 370/82–84, 506; 375/355, 357, 356, 362, 365, 368, 373, 376–377, 327, 364; 327/156; 364/514 R, 514 B, 514 C, 483–485, 572, 576; 395/200.01, 200.19

[56] References Cited

U.S. PATENT DOCUMENTS

| | | | |
|---|---|---|---|
| 4,644,561 | 2/1987 | Paneth et al. | 375/9 |
| 4,675,863 | 6/1987 | Paneth et al. | 370/50 |
| 4,912,705 | 3/1990 | Paneth et al. | 370/95.1 |
| 5,528,585 | 6/1996 | Cooley et al. | 370/56 |
| 5,546,383 | 8/1996 | Cooley et al. | 370/50 |
| 5,602,835 | 2/1997 | Seki et al. | 370/206 |
| 5,617,419 | 4/1997 | Christensen et al. | 370/471 |

FOREIGN PATENT DOCUMENTS

| | | | |
|---|---|---|---|
| 0431957A2 | 12/1989 | European Pat. Off. | H04L 7/04 |
| 4039117A1 | 4/1990 | Germany | H03J 7/18 |
| 4212194A1 | 4/1991 | Germany | H04B 7/212 |
| 4006931A1 | 9/1991 | Germany | H04H 1/00 |
| 4006933A1 | 9/1991 | Germany | H04H 1/00 |
| 2206768 | 1/1989 | United Kingdom | H04L 27/18 |
| WO 82/00074 | 6/1980 | WIPO | H04J 1/02 |
| WO 89/12931 | 6/1988 | WIPO | H03L 7/10 |
| WO 91/17613 | 5/1990 | WIPO | H04L 7/04 |
| WO 95/05042 | 2/1995 | WIPO | H04L 5/06 |
| WO 95/13658 | 5/1995 | WIPO | H03L 7/08 |

OTHER PUBLICATIONS

Cimini, Jr., "Analysis and Simulation of A Digital Mobile Channel Using Orthogonal Frequency Division Multiplexing", IEEE Transactions on Communications, vol. COM–33, No.7, pp. 665–675, Jul. 1985.

John A. C. Bingham, "Multicarrier Modulation for Data Transmission: An Idea Whose Time Has Come", IEEE COmmunications Magazine, vol. 28, No. 5, pp. 5–8, 11–14, May 1990.

Simon, M.K. and Wang, C.C., "Bit Synchronization of Differentially Detected MSK and GMSK" IEEE International Conference on Communications, vol. 2, pp. 583–590, Jun. 1985.

E. Casas and C. Leung, "OFDM for Data Communication over Mobile Radio FM Channels, Part I: Analysis and Experimental Results", IEEE Transactions on Communications, vol. 39, pp. 783–793, May 1991.

A. Bailer, G. Heinrich, and U. Wellens, "Bit Synchronization and Timing Sensitivity in Adaptive Viterbi Equalizers for Narrowband–TDMA Digital Mobile Radio Systems", IEEE Vehicular Technology Conf., Philadelphia, PA., pp. 377–384, 1988.

(List continued on next page.)

*Primary Examiner*—Emanuel T. Voeltz
*Assistant Examiner*—Cuong H. Nguyen
*Attorney, Agent, or Firm*—Jimmy L. Funke

[57] ABSTRACT

A synchronization network that provides frame timing that is particularly suited for a Eureka-147 system is disclosed. The synchronization network reduces the typical amount of computations required to provide for frame timing schemes and includes matched filtering operations that separate the waveforms of null and sine symbols contained in the multiple carriers of the Eureka-147 system. The matched filtering technique are accomplished before a fast Fourier transform operation and which accomplishments elimination of the need of an inverse fast Fourier transform operation normally performed by one of the receiver elements of the Eureka-147 system. This elimination is accomplished without degrading the performance of the Eureka-147 system.

17 Claims, 5 Drawing Sheets

OTHER PUBLICATIONS

Yves–Francois Dehery, "A Digital Audio Broadcasting System for Mobile Reception", CCETT of France, pp. 35–57, 1990.

Chow, et al., "A Discrete Multitone Transceiver System for HDSL Applications", IEEE Journal on Sel. Areas in Comm., vol. 9, No.6, pp. 895–908, Aug. 1991.

Alard, et al., "Principles of modulation and channel coding for digital broadcasting for mobile receivers", EBU Review–Technical, No. 224, pp. 168–190, Aug. 1987.

Pennington, "Techniques for medium–speed data transmission over HF channels", IEE Proceedings, vol. 136, part 1, No. 1, pp. 11–19, Feb. 1989.

Le Floch, et al. "Digital Sound Broadcasting to Mobile Receivers", IEEE Transactions on Consumer Electronics, vol. 35, No. 3, pp. 493–503, Aug. 1989.

Stein, et al., "Modern Communication Principles with Application to Digital Signaling", pp. 290–299, McGraw–Hill, Inc., 1967.

D.L. Nielson, "Microwave Propagation and Noise Measurements for Mobile Digital Radio Application", pp. iii–iv, vi–ix., from SRI International, Jan. 1975.

Ch. Weck and G. Theile, "Digital Audio Broadcasting: Optimizing of A Combined Concept of Source and Channel Coding with respect of Subjective Criteria", Institut fur Rundfunktechnik GmbH, F.R.G. pp. 360–363, 1990.

Digital Sound Broadcasting to Vehicular, Portable, and Fixed Receivers for BSS (SOund) in the frequency range 500–3000 MHz, Document 10/30–E, 10 Dec. 1991.

Digital Sound Broadcasting to Mobile Receivers, Bernard Le Floch, Roselyne Halbert–Lassalle Damien Castelain, IEEE Transactions on Consumber electronics, vol. 35, No. 3 August 1989.

NETWORK FOR TIME SYNCHRONIZING A DIGITAL INFORMATION PROCESSING SYSTEM WITH RECEIVED DIGITAL INFORMATION

CROSS REFERENCE TO RELATED U.S. PATENT APPLICATIONS

The present invention relates to U.S. patent applications having Ser. Nos. 08/570,213, 08/574,095, and 08/574,096 and all of which are related to a digital audio broadcasting (DAB) system.

FIELD OF THE INVENTION

The present invention relates to a network that provides timing synchronization that is particularly suited for digital signal processing systems. More particularly, the present invention relates to a synchronization network that is particularly suited for a digital audio broadcasting (DAB) system that employs multiple carriers transmitted at the same time and serving as vehicles for transmitting sound information and data information along with synchronization symbols all in the form of a stream of digital pulses. Specifically, the present invention relates to a synchronization network that provides timing synchronization for a Eureka-147 system. The synchronization network employs filters that are selected and matched to the waveforms of some of the synchronization symbols carried by the multiple carriers of the Eureka-147 system, and which filtered waveforms serve as sources to derive the timing synchronization.

BACKGROUND OF THE INVENTION

Digital techniques for the transmission and reception of the sound information, sometimes referred to a digital audio broadcasting (DAB), have progressed over the past few years and are anticipated, on a worldwide basis, to replace the present frequency modulation (FM) method of transmitting sound. Digital audio broadcasting (DAB) is not only anticipated to replace FM modulation, but also, the quality of the sound of such replacement, produced by DAB, will be greatly enhanced, making DAB's acceptance welcomed worldwide.

In order for the digital audio broadcasting technology to be accepted by the broadcasting industry, as well as by the industry that produces the associated electronic equipment, one system that acts as a standard must be chosen so that all participants will know the characteristics of the transmitted and received signals thereof. Some prominent foreign countries including Western Europe and Canada, have already accepted a system known as Eureka-147, proposed by a European consortium, which is becoming an international standard.

In order for any system, such as the Eureka-147 system, to serve as a standard, it must specify all of the requirements for its data management, such as the manner in which the digital information, in the form of digital pulses representative of sound, is compressed and how its data contents are coded, as well as the manner in which the data is transmitted and received. The Eureka-147 system employs multiple adjacent carriers transmitted at the same time and formatted in an orthogonal frequency division multiplexing (OFDM) modulation scheme. The multiple carriers serve as vehicles for digital information representative of audio or data signals.

For any system, including the Eureka-147 system, it is desired that the sample rate timing of the receiver be locked to the sample rate of the transmitted information. In FM communication systems, this is accomplished by locking the frequency of the signal receiver to the tuned station's frequency, typically by means of a phase-lock loop (PLL). In DAB systems, this is equivalent to acquiring time and frequency synchronization.

One technique for locking the sample rate of a receiver of the Eureka-147 system to the transmitted information thereof employs a digital phase-lock loop network cooperating with a data buffer. Such a technique employing a digital phase-lock loop is described in U.S. patent application Ser. No. 08/574,096, having Attorney Docket No. H-169,952, and entitled "DIGITAL PHASE-LOCK LOOP NETWORK", which is assigned to the assignee of the present invention, and which patent application is herein incorporated by reference.

The accuracy of the sample rate timing between the transmitting and receiving elements of the Eureka-147 system may be relaxed somewhat by the employment of a differential demodulation scheme that decodes differential information between the multiple adjacent carriers of the Eureka-147 system. Such a demodulation scheme is described in U.S. patent application Ser. No. 08/574,095, and entitled "DIFFERENTIAL DEMODULATOR", which is assigned to the assignee of the present invention, and which patent application is herein incorporated by reference.

A related technique for providing frequency synchronization of the transmitted and received information employs an AFC frequency synchronizing technique and is described in U.S. patent application Ser. No. 08/570,213, and entitled AFC FREQUENCY SYNCHRONIZATION NETWORK, which is assigned to the assignee of the present invention, and which patent application is herein incorporated by reference.

The Eureka-147 system accommodates techniques for providing time synchronization of transmitted and received information by having time synchronization symbols placed at the beginning of each data frame transmitted by its transmitter. What is therefore needed is a simple and efficient technique for utilizing such time synchronization symbols to provide time synchronization of the receiving system with that of the transmitted data.

SUMMARY OF THE INVENTION

The time synchronization network of the present invention addresses the needs and concerns set forth in the BACKGROUND section. In general, the synchronization network of the present invention provides frame timing particularly suited for the Eureka-147 system. The synchronization network reduces the amount of computations required to accomplish frame timing, relative to prior art schemes, by rearranging the operational sequence, wherein matched filtering operations are situated before and not after a fast fourier transform operation typically accomplished within the receiver elements of the Eureka-147 system. This rearrangement of the matched filtering eliminates a normally conducted inverse fast fourier transform operation and does so without degrading the performance of the Eureka-147 system.

In one embodiment, the synchronization network comprises means for accepting incoming digital signals, means for performing matched filtering, means for performing a fast fourier transform operation, means for detecting peak signals in the frequency domain, and means for providing timing for digital sampling of digital data signals. The incoming digital signals include a sine-sweep synchronization symbol having a phase assignment in the frequency domain of the multiple sine-sweep symbol carriers, and on which digital signals an inverse fast Fourier transform (IFFT) operation has been performed. The incoming digital signals are accepted by matched filtering, preferably accomplished by a complex multiplication operation. The matched filtered sine-sweep symbol is then applied to the fast Fourier transform (FFT) operation which routes an impulse response derived therefrom to the peak detect means. The peak detect means analyzes the impulse response in the frequency domain of the carriers and determines a quantity representative of the time offset in increments of the sampling clock. The time offset quantity is routed to a master timer which then selects the proper time for the sampling of the incoming signals.

One object of the present invention to reduce the complexity of the techniques involved with providing sample-rate timing synchronization for the Eureka-147 system.

Another object of the present invention is to provide timing synchronization that employs filtering selected and matched to the waveforms of certain synchronization symbols carried by the multiple carriers of the Eureka-147 system.

Other objects of the present invention, as well as advantages there over existing prior art forms, will be apparent in view of the following description accompanied by means hereinafter described and claimed.

DESCRIPTION OF THE PREFERRED EMBODIMENTS

Figure 1:
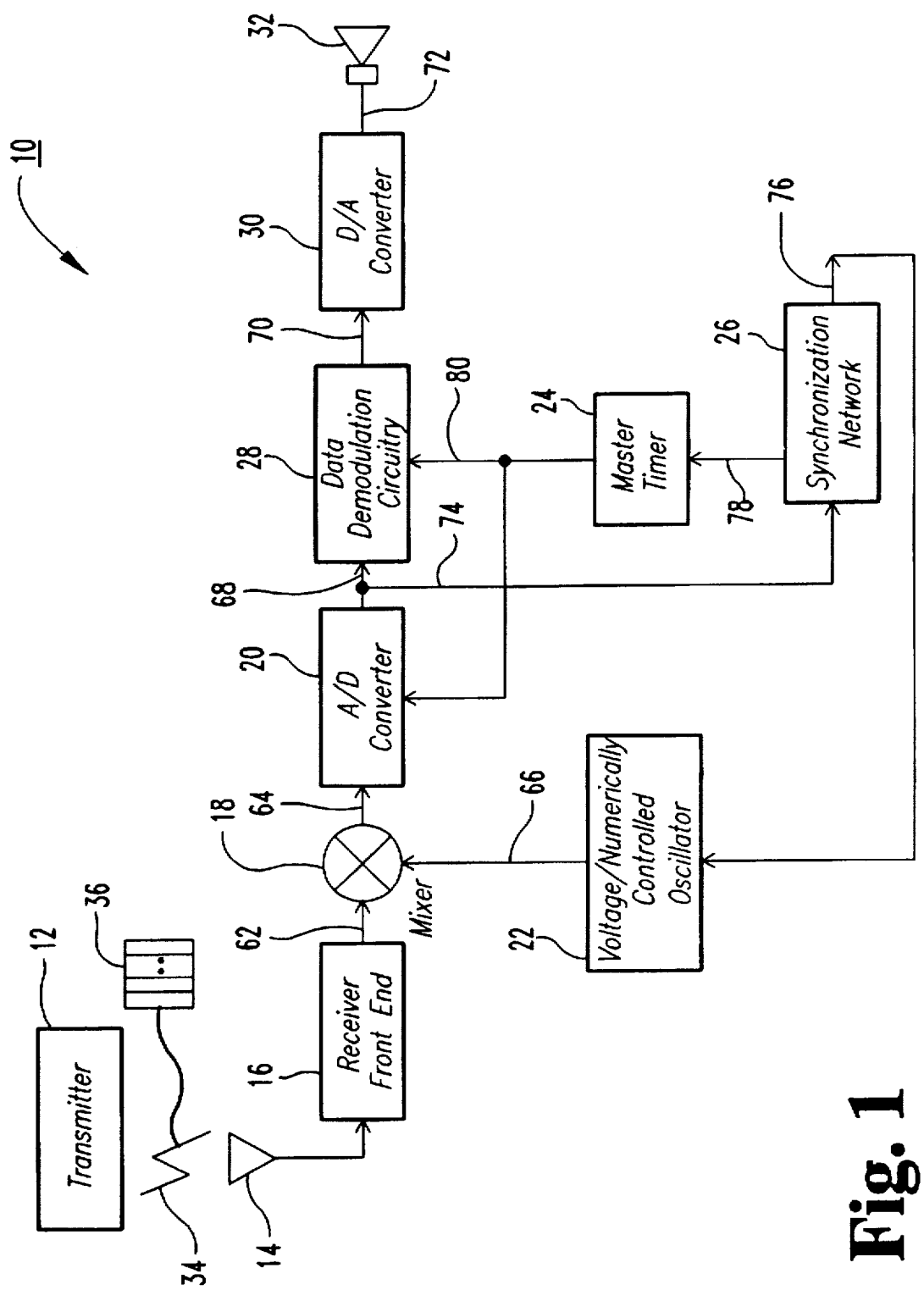
FIG. 1 is a block diagram of the present invention particularly suited for the Eureka-147 system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings, wherein like numbers designate like elements, there is shown in FIG. 1, a block diagram of a digital processing system 10 whose principles are directly applicable to the Eureka-147 system discussed in the "Background" section. The Eureka-147 system serves as at least one standard for the new digital broadcasting technology known as digital audio broadcasting (DAB). The DAB is anticipated as replacing the FM modulation method for the transmission and reception of sound information contained in the bandwidth that includes a range of sound frequencies from approximately 20 to 20,000 Hz.

The Eureka-147 system employs multiple carriers that are sent at the same time and are transmitted by a modulation scheme referred to as coded orthogonal frequency division multiplexing (COFDM) that is described in the technical article "Digital Sound Broadcasting to Mobile Receivers", of B. LeFloch et al., published in the *IEEE Transactions* on Consumer Electronics, Vol. 35, No. 3, August, 1989. The Eureka-147 system operates in three modes (I, II, and III). A general definition of each of the three operational modes is given in Table 1.

TABLE 1

| EUREKA-147 SYSTEM OF ABOUT 2 MHZ BANDWIDTH | | | |
|---|---|---|---|
|  | MODE I | MODE II | MODE III |
| $T_F$ | 96 ms | 24 ms | 24 ms |
| $T_{null}$ | 1.297 ms | 324 ms | 168 ms |
| $T_s$ | 1.246 ms | 312 ms | 156 ms |
| ts | 1 ms | 250 ms | 125 ms |
| $\Delta$ | 246 ms | 62 ms | 31 ms |
| J | 76 | 76 | 153 |
| n | 2048 | 512 | 256 |
| fmax | 325 MHZ | 1.5 Ghz | 3.0 Ghz |
| Active Carriers | 1536 | 384 | 192 |
| Virtual Carriers | 512 | 128 | 64 |
| fsep | 1 kHz | 4 kHz | 8 kHz |
| TBW | 1.536 MHZ | 1.536 MHZ | 1.536 MHZ |
| fsample | 2.048 MHZ | 2.048 MHZ | 2.048 MHZ |

Referring to Table 1, $T_F$ is the data frame duration, $T_{NULL}$ is a null symbol duration, ts is the useful symbol duration, $\Delta$ is the guard interval duration, Ts is the overall symbol duration; Ts=ts+$\Delta$, J is the number of symbols per frame (the null symbol being excluded), n is the maximum number of carriers for the considered system bandwidth, fmax=highest carrier frequency for $\beta$=fmax * Ts<0.08, Active Carriers=carriers of Orthogonal Frequency Division Multiplexing (OFDM) signals that contain information, Virtual Carriers=carriers with no information, fsep=carrier separation, $T_{BW}$=total actual signal bandwidth, and fsample=sample rate for Fast Fourier Transform (FFT) operation.

The Eureka-147 system utilizes multiple frequency domain carriers as vehicles for digital sound information, rather than a single-phase carrier having a high data rate as is known in the prior art. The use of the multiple carriers to transmit sound information in the form of digital pulses increases data symbol duration as to avoid intersymbol interference associated with delay spread of an RF channel. The wide band width reduces the effects of narrow band multipath interference. The Eureka-147 system employing the principles of the present invention includes an envelope detecting filter or a matched filter for the waveform of a synchronization symbol, i.e., null symbol, to obtain a rough estimate of frame timing so as to locate the data symbols within the frame, and a matched filter of the waveform of a synchronization symbol sine-sweep to obtain a more precise frame timing. As will be further discussed hereinafter, the present invention utilizes a computational technique designed to obtain the precise frame timing that is more efficient than known prior art techniques so as to reduce the computation complexity heretofore required by the Eureka-147 system.

The digital information carried by each of the multiple carriers is preferably modulated by a π/4-differential quad-phase shift key (π/4 DQPSK) modulation scheme known in the art. The Eureka-147 system employing the principles of the present invention preferably utilizes differential decoding, in particular, a differential demodulator that does not require synchronous demodulation, but rather may be operated in such a manner as that described in the previously incorporated by reference U.S. patent application Ser. No. 08/574,095. As more fully described in the foregoing patent application, each of the multiple carriers of the Eureka-147 system yields two bits of digital information via π/4 DQPSK modulation. The multiple carriers are arranged in adjacent arrays using an inverse fast Fourier transform (IFFT) algorithm, which assigns complex phases to each frequency domain carrier. Further, the data carried by the carriers are differentially encoded between individual carriers on successive symbols. Since differential demodulation is preferably used by the practice of this invention, precisely accurate bit timing is not required. The timing of the samples taken by the receiving elements of the Eureka-147 system need not be at the peak location of the "open eye" as is common in digital communication systems, but rather timing need only accurately reflect the beginning of a transmitted symbol (n=256 points (see Table 1)). The bit timing of the present invention thus need only be approximately accurate to obtain a majority of the transmitted data, sometimes referred to as symbol energy. Further, the demodulator decoding preferably used by this invention between adjacent symbols eliminates errors associated with bit offset timing known in the art. The system 10 of the present invention that transmits and receives digital information defined by the Eureka-147 system comprises the plurality of elements given in Table 2.

TABLE 2

| REFERENCE NO. | ELEMENT |
|---|---|
| 12 | TRANSMITTER |
| 14 | RECEIVING ANTENNA |
| 16 | RECEIVER FRONT END |
| 18 | MIXER |
| 20 | A/D CONVERTER |
| 22 | VOLTAGE/NUMERICALLY CONTROLLER OSCILLATOR |
| 24 | MASTER TIMER |
| 26 | SYNCHRONIZATION NETWORK |
| 28 | DATA DEMODULATION CIRCUITRY |
| 30 | D/A CONVERTER |
| 32 | SPEAKER |

The data demodulation circuity 28 may include the differential modulator described in previously incorporated by reference having Attorney Docket No. H-169,591, and the digital phase-lock loop described in previously incorporated by reference having Attorney Docket No. H-169,952. Similarly, the D/A converter 30 and the speaker 32 may each include additional elements arranged to accommodate a plurality of stereo channels in a manner as described in Attorney Docket No. H-169,952. The data demodulation circuitry 28 retrieves and gathers digital quantities that are converted into analog information by the D/A converter 30 so as to be reconstructed and reproduced as high quality sound by speaker 32.

The transmitter 12 and the receiver front end 16, both of FIG. 1, are interconnected by a communication link 34 that comprises coded digital information 36 in the form of a stream of digital data, which stream of data may be further described with reference to FIG. 2, composed of FIGS. 2A, 2B, 2C, and 2D.

Figure 2A:
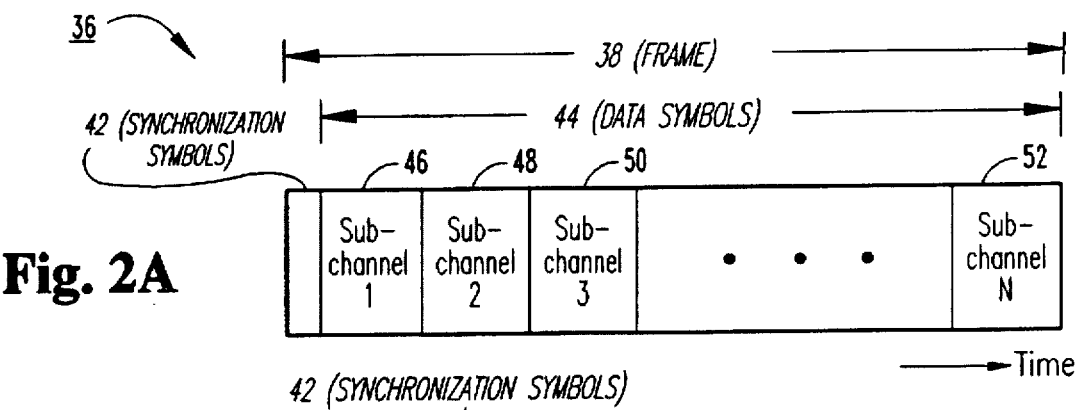
FIG. 2 is composed of FIGS. 2A, 2B, 2C and 2D that illustrates the frame structure of the stream of digital information transmitted by the transmitter of FIG. 1 and received by the receiver front end also illustrated in FIG. 1.

The digital information depicted in FIG. 2A is defined by frames, such as frame 38, having a predetermined duration with a typical duration value of 0.024 seconds (see Table 1). Frame 38 defines a structure having a juxtaposition arrangement that includes synchronization symbols 42 which occur first in time in frame 38, followed by data symbols 44 which are defined by time multiplexed digital sound information for sub-channel 1, sub-channel 2, sub-channel 3 . . . sub-channel N, shown respectively by blocks 46, 48, 50 . . . 52. It is to be understood that the information of sub-channel 1, sub-channel 2, sub-channel 3 . . . sub-channel N can represent stereo/mono audio or data information.

Figure 2B:
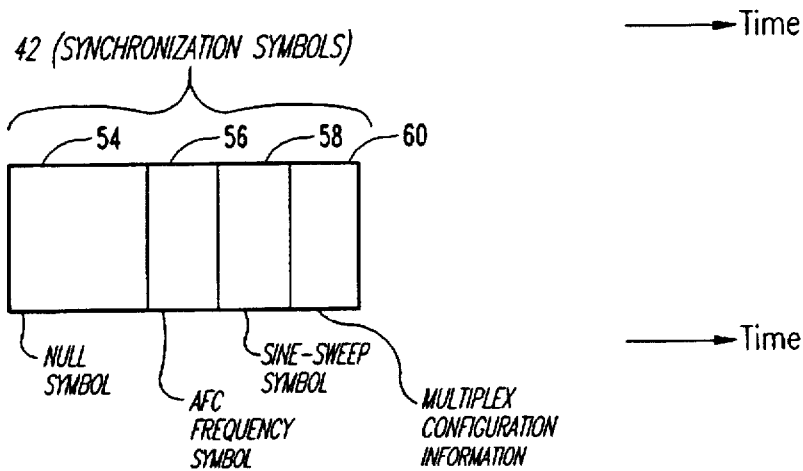

The synchronization symbols 42, shown in FIG. 2B, comprise symbols designated null symbol, AFC frequency symbol, sine-sweep symbol, and multiplex configuration information, and are respectively indicated as 54, 56, 58, and 60. Some of these synchronization symbols 42 serve as timing information which are added at the beginning of each frame 38 to permit the receiver to time synchronize with the data stream 36. The null 54 and sine-sweep 58 symbols are of particular importance to the present invention, and are more fully described hereinafter.

Figure 2C:
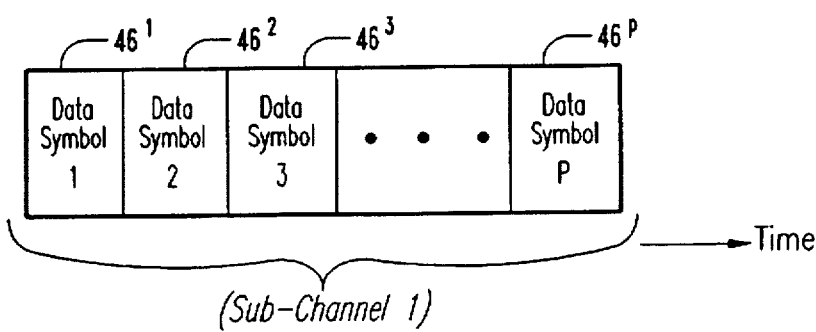
Figure 2D:
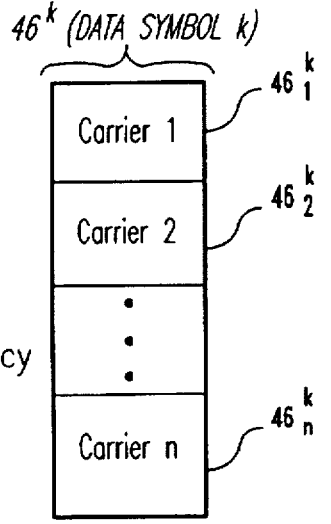

As seen in FIG. 2C, each of the sub-channels, such as sub-channel 1 (46), is further defined as containing multiple adjacent data symbols, data symbol 1, data symbol 2, data symbol 3, . . . data symbol P, respectively shown in blocks $46^1$, $46^2$, $46^3$, and $46^p$. With reference to FIG. 2D, each data symbol, such as the kth data symbol ($46^k$), is further defined as containing multiple carriers, carrier (1), carrier (2), carrier (3), . . . carrier (n), respectively shown in blocks $46^k_1$, $46^k_2$, $46^k_3$, and $46^k_n$, wherein the n carriers are spread over a frequency bandwidth of interest (see Table 1). Each of the carriers are phase modulated between adjacent data symbols so that each carrier is phase modulated over time. Thus, each of the n carriers are transmitted simultaneously as a data symbol, and each of the p data symbols are transmitted at discrete time intervals. Frames 38 of data are typically transmitted very 24–96 milliseconds (see Table 1). In accordance with the Eureka-147 format, the synchronization of data sampling by system 10 with the transmitted data may be determined by the repetitive occurrence of the null and sine-sweep symbols, and may be further described with reference back to FIG. 1.

The transmitter 12 transmits the digital data stream 36 comprising digital information frame 38 which is received by antenna 14 which, in turn, routes the received information to the receiver front end 16. The receiver front end 16 may have amplifying means to amplify the received signals and routes such received/amplified signals to a mixer 18 by way of signal path 62. The mixer 18, in response to the signal on its first input 62 and that applied to its second input by way of signal path 66 generated by voltage/numerically controlled oscillator 22, combines its input signals and develops an output signal whose frequency is equal to the difference between the frequencies of its input signals, and routes such an output signal to the A/D converter 20 by way of signal path 64. Mixer 18 thus provides a frequencyadjusted analog signal that is routed to the A/D converter 20. The digital quantities generated by the A/D converter 20 are routed, by way of signal path 68, to the data demodulation circuity 28 which, in turn, retrieves the digital information therefrom and directs such to the D/A converter 30 by way of signal path 70. The D/A converter 30 provides output analog quantities that are routed to the speaker 32 by way of signal path 72. The speaker 32 reproduces the correct information that was accepted by the A/D converter 20 in response to the combined operation of the voltage/ numerically controlled oscillator 22, master timer 24 and the synchronization network 26.

In general, and in a manner as to be more fully described hereinafter, the synchronization network 26 receives a signal present on signal path 74 (common to signal path 68 in FIG. 1) created by the A/D converter 20, and which signal is indicative of the frequency at which the samples of the informational data 36 are being received by the A/D converter 20. The synchronization network 26, in response to the signal present on signal path 74, generates an output signal routed to master timer 24, via signal path 78. The master timer 24, sometimes referred to as a master clock, by means of its output signal on signal path 80 controls the sample timing by which all of the interconnected elements, such as 20 and 28, sample their associated signals. The operation of the synchronization network 26, as it pertains to the present invention, provides for time synchronization that uses feedback so that the master timer 24 generates windows, that is, intervals during which the circuits are gated open, to permit their proper signal sampling.

Figure 3:
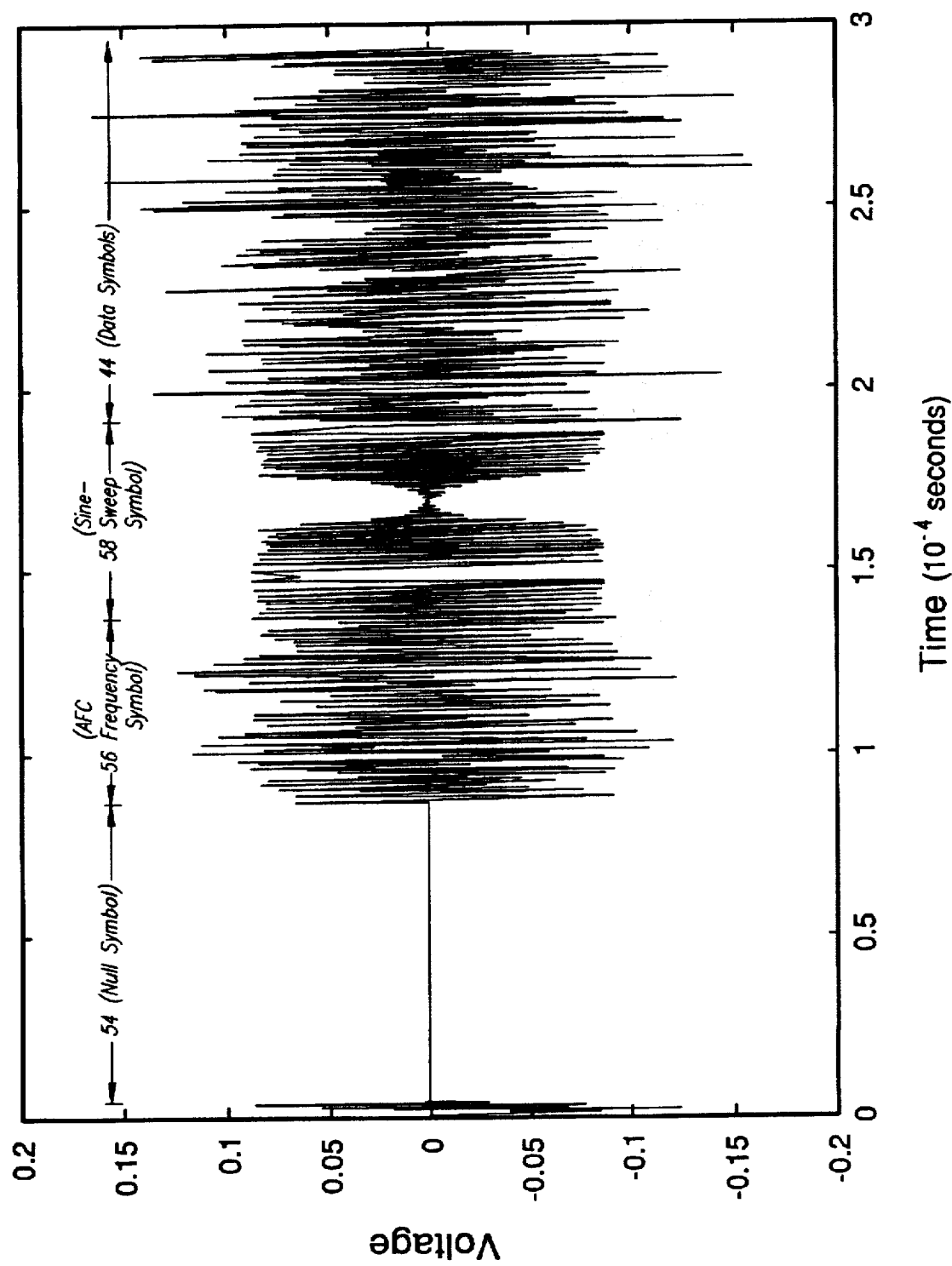
FIG. 3 illustrates a time domain representation of a frame of digital data that contains the synchronization symbols and data symbols illustrated in FIG. 2.

Referring now to FIG. 3, a time domain representation of a partial data frame 38 is shown, which illustrates the location and profiles of the null symbol 54, AFC frequency symbol 56, sine-sweep symbol 58, followed by the data symbols 44, all previously discussed with reference to FIG. 2. The contents of the data 44 is computed by means of an inverse fast Fourier transform (IFFT) operation performed by the transmitter 12. The sine-sweep symbol 58 is given, by the IFFT operation, a special phase assignment $P_k$ in the frequency domain that may be expressed as:

$$P_k = exp(i\Phi_k); \Phi_k = (\pi k^2/n) \quad (1),$$

wherein k is the number of the frequency bin, or the number of the carrier frequency (0, 1, 2, ... n) of the Eureka-147 system, and n is the total number of the multiple carriers used in the particular application (see Table 1).

As seen in FIG. 3, the waveform representing the sine-sweep symbol 58 resembles that of a well-known "chirp" signal having a form of modulation in which the frequency of the signal is deliberately changed. The null symbol 54, as shown in FIG. 3, lacks the energy of the other COFDM symbols and can be used to obtain a rough estimate of frame 38 timing from the time domain data stream by means of an envelope detector or matched filter. Typically, such a rough estimate of frame timing permits system 10 to pull the sampling operation to within approximately +/- n/32 bits of accurate symbol timing, wherein n=number of carriers. The sine-sweep symbol 58 is then used by system 10 to more precisely obtain frame timing.

Figures 4A, 4B:
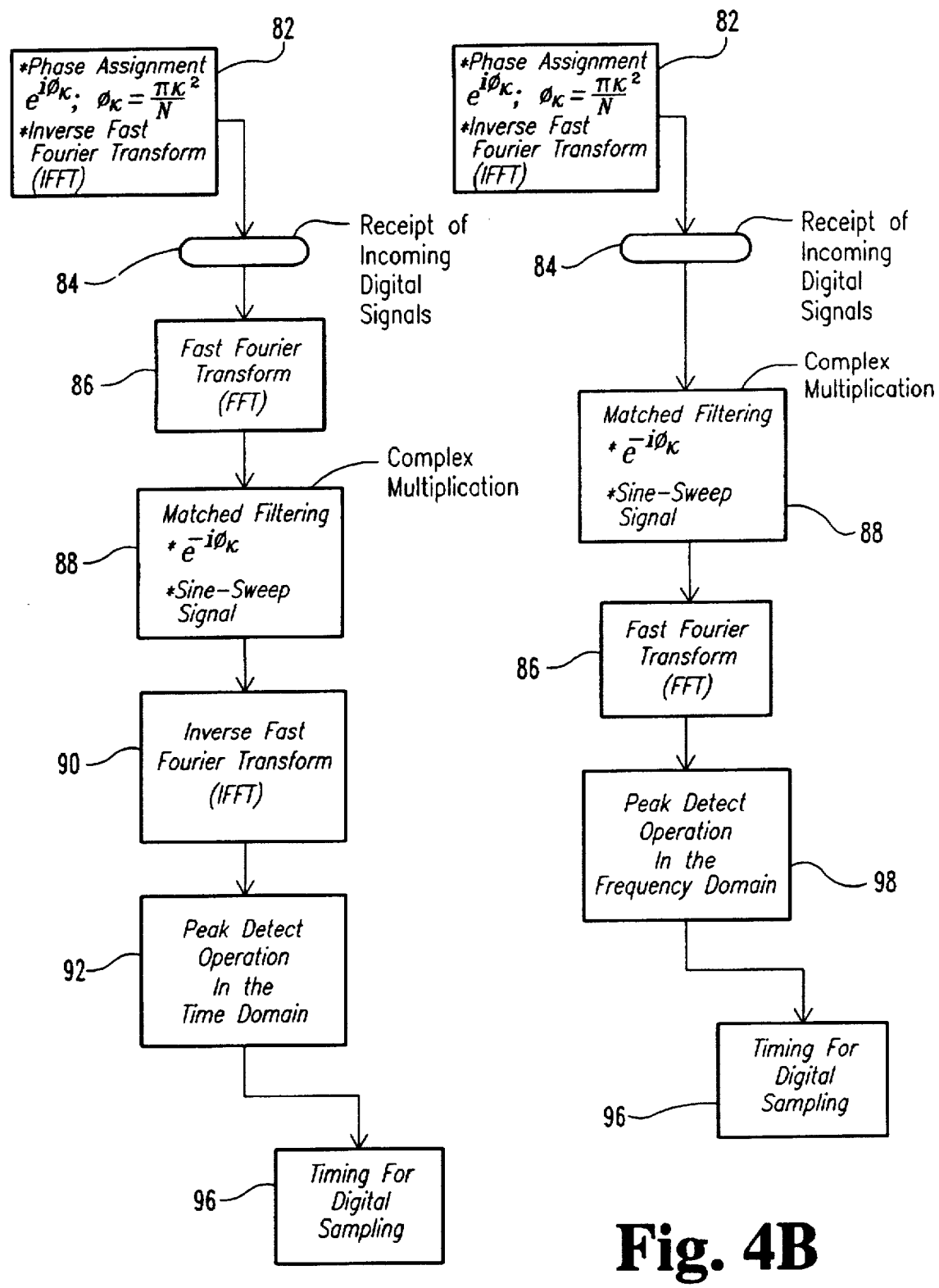
FIG. 4 is composed of FIGS. 4A, and 4B that respectively illustrate the sequential arrangement of data processing segments of a prior art time synchronization technique, and a sequential arrangement of data processing elements, in accordance with the present invention, for providing time synchronization of the receiver of FIG. 1 with the transmitted data.

The Eureka-147 system has included the sine-sweep symbol 58 within the synchronization symbols 42 specifically to permit such precise frame timing through the utilization thereof. A prior art technique for utilizing the sine-sweep symbol in order to provide such precise frame timing is shown in FIG. 4A, which illustrates a sequential arrangement of operational elements related to the operation of the Eureka-147 system as set forth in Table 3.

TABLE 3

| REFERENCE NO. | OPERATIONAL ELEMENT |
|---|---|
| 82 | |
| 84 | RECEIPT OF INCOMING DIGITAL SIGNALS |
| 86 | FAST FOURIER TRANSFORM (FFT) |
| 88 | MATCHED FILTERING |
| 90 | INVERSE FAST FOURIER TRANSFORM (IFFT) |
| 92 | PEAK DETECT OPERATION IN THE TIME DOMAIN |
| 96 | TIMING FOR DIGITAL SAMPLING |

The operational block 82 represents that the information received by antenna 14 has a sine-sweep symbol to which has been assigned the particular phase given by equation (1), and on which an inverse fast Fourier transform (IFFT) operation has been performed thereon to obtain the data transmitted after the null symbol and frequency symbol (see FIG. 3). As seen in FIG. 4A, the operational block 82 contains the term $e^{i\Phi_k}$, representative of equation (1), whereas the operational block 88 contains the term $e^{-i\Phi_k}$ to illustrate the matched filter response characteristic for the sine-sweep symbol having the special phase assignment. In addition to the special phase assignment in the frequency domain for the sine-sweep symbol, the sine-sweep symbol has predetermined real and imaginary components located in the time domain of the multiple carriers. The information containing the null and sine-sweep symbols is received (operational block 84) and routed to operational block 86.

The fast Fourier transform (FFT) of operational block 86 is performed on the waveforms of FIG. 3, in particular, it is performed on the roughly estimated location of the sine-sweep symbol 58 of FIG. 3 and such roughly estimated location is determined by processing the null symbol of FIG. 3. The roughly estimated location of the sine-sweep symbol 58 is typically determined by performing a matched filter operation on the data frame 38 to determine the approximate location of the null symbol 54. Once determined, the approximate time to the sine-sweep symbol 58 can be computed. The operational block 86 transforms the data frame 38 to a frequency domain representation thereof, preferably in accordance with a known Fast Fourier Transform (FFT) operation. The transformed data (FFT carriers) is then applied to operational block 88.

The operational block 88 accepts the FFT carriers and performs a matched filtering operation thereon. The matched filtering block 88 is operable to compare the incoming signal with a replica of the sine-sweep symbol 58, which operation is typically carried out by multiplying the FFT carriers by a complex-conjugate waveform to thereby determine the related phase information of the sine-sweep waveform. If the timing, such as that described with reference to synchronization network 26 of FIG. 1, is relatively perfect, the complex-conjugate multiplication performed in the frequency domain shown in FIG. 3 produces a constant quantity. However, if the timing is early or late, the results of the complex-conjugate multiplication provided by operational block 88 results in rotating phasors. In any event, the output of the matched filtering operation 88 is routed to operational block 90.

The operational block 90 includes an inverse fast Fourier transform (IFFT) calculation that produces an impulse response of the matched filtering operation which is routed to operational block 92. The operational block 92 checks the peak condition of the impulse response within its time domain and derives an output signal that is representative thereof and that is routed to operational block 96. If the matched filtering operation of block 88 determines that the sample timing of the receiving system is perfect with respect to the transmitted sine-sweep symbol 54, an impulse response within a predetermined time window will be observed. If, however, the transmitted sine-sweep symbol 58 is early or late with respect to the timing of symbol 58 expected by the receiving system, the impulse response will be correspondingly offset with respect to the "perfect timing" impulse response.

The output signal developed by the peak detection operation 92 is applied to a routine (developed by operational block 96) that develops a timing signal that is routed to the master timer 24, previously described with reference to FIG. 1. The master timer 24, in response to the signal of the peak detection, provides for the proper sampling of informational data 36 of FIG. 2. Thus, if the sine-sweep symbol 58 is detected as being received earlier than expected, the master timer 24 will delay the sample timing accordingly. Similarly, if the sine-sweep symbol 58 is detected as being received later than expected, the master timer 24 will increase the advance the sample time accordingly. In either case, the result of the timing synchronization operation set forth in FIG. 4A results in a nearly perfect sample timing adjustment which permits the receiver to sample the data symbols 44 with nearly perfect sample timing.

It has been determined by the inventors of the present invention that the arrangement of FIG. 4A is needlessly complex, and that a more efficient arrangement could be developed. Specifically, it was determined that the matched filtering step (88 of FIG. 4A) could be performed prior to the FFT step (86 of FIG. 4A), and that the peak detect step (92 of FIG. 4A) could be performed in the frequency domain. By implementing such an arrangement, the IFFT step (90 of FIG. 4A) can be eliminated. Such an operational arrangement, in accordance with the present invention, is set forth in FIG. 4B.

Referring now to FIG. 4B, the timing synchronization arrangement of the present invention is shown as an arrangement of sequential operations. The operation of the arrangement shown in FIG. 4B is the same as that shown and described with respect to FIG. 4A with four exceptions. The first is that the matched filtering operational block 88 for the null and sine-sweep symbols is accomplished before the fast Fourier transform of operational block 86.

Secondly, the matched filtering of the null symbol 54 is preferably accomplished via an envelope filter that is operable to detect the occurrence of the null symbol 54. As is known in the art, such an envelope filter may be accomplished via an analog or a digital process. The envelope filter is operable to detect the null symbol and produce an amplitude envelope representative thereof. An absolute minimum value of the envelope is then determined along with a time reference at which the absolute minimum occurs. A predetermined time value is then added to the time reference to determine a first estimate of the time of occurrence of the sine-sweep symbol 58, wherein the predetermined time value is a known duration between the expected envelope minimum and the occurrence of the sine-sweep symbol 58. As previously described, such a first estimate is accurate to within +/−n/32 bits of the actual time occurrence of the sine-sweep symbol 58, where n=number of carriers, to thereby provide a rough estimate of the sine-sweep symbol 58 location within frame 38. Alternatively, the matched filter technique described with respect to FIG. 4A may be used to detect the occurrence of the null symbol 54.

Thirdly, the fast Fourier transform 86 produces an impulse response corresponding to an energy distribution of the matched filter output in the frequency domain. The resulting impulse response is analyzed by a peak detection operation 98 wherein a peak energy search is performed to determine the frequency at which the peak energy of the energy distribution occurs. Unlike the time domain operation of the operational block 92 of FIG. 4A, however, the operational block 98 of FIG. 4B performs such a peak detection operation in the frequency domain. The peak detection operation 98 produces an output signal that is routed to operational block 96 as previously described. The operational block 96 then computes the time offset value for adjusting the sample timing via master timer 24 by determining a difference between the frequency at which the peak energy occurs in an early or late sine-sweep symbol 58 and a reference frequency corresponding to the frequency at which the peak energy should occur in a perfect timing condition (ie. when the sine-sweep symbol 58 and the replica of the sine-sweep symbol within the matched filter are coincident in time). This frequency difference is then simply inverted to produce the time offset value provided to the master timer 24. In this manner, a second, and more accurate, estimate of the time location of the sine-sweep symbol 58 within frame 38 is determined. Using the concepts of the present invention, such a second estimate is typically accurate to within +/− 1 bit of the actual time location of the sine-sweep symbol 58.

Finally, as a result of the foregoing modifications, the inverse fast Fourier transform of operational block 90, is no longer required. Advantageously, the omission of the IFFT operation permits simplification of system 10 and a reduction on the number and complexity of computational steps.

The sequential arrangement shown in FIG. 4B produces substantially the same results as that of FIG. 4A, even though it does not require an inverse fast Fourier transform (IFFT) operation in the receiver elements of the Eureka-147 system. The result of the practice of the present invention is that the computations required for the Eureka-147 system are correspondingly reduced.

Figure 5:
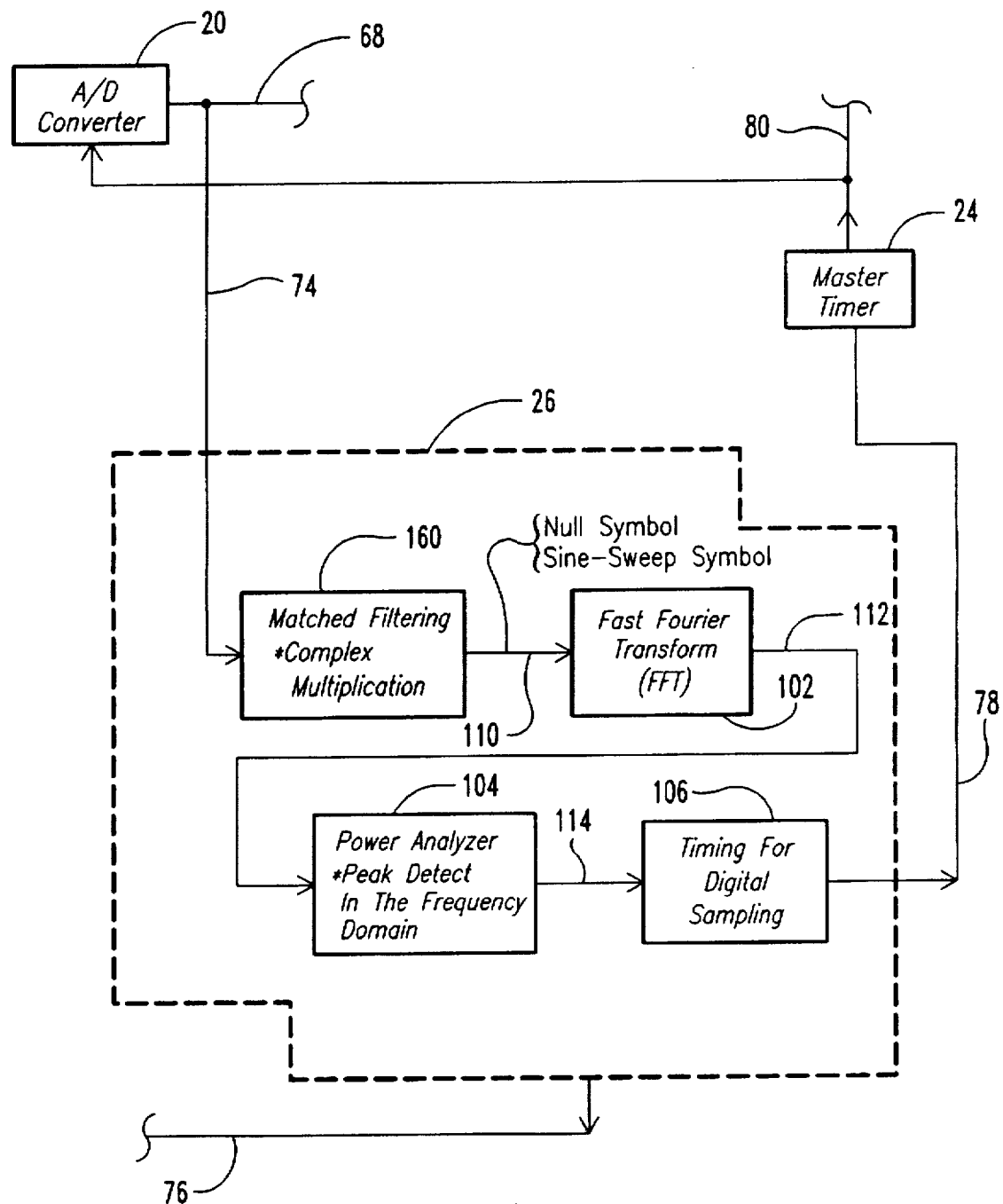
FIG. 5 is a block diagram illustrating one embodiment of a time synchronization network, in accordance with the present invention.

A synchronous network 26 for carrying out the concepts of the present invention is shown in FIG. 5 and comprises the plurality of elements given in Table 4.

TABLE 4

| REFERENCE NO. | ELEMENT |
|---|---|
| 100 | MATCHED FILTERING |
| 102 | FAST FOURIER TRANSFORM (FFT) |
| 104 | POWER ANALYZER |
| 106 | TIMING FOR DIGITAL SAMPLING |

FIG. 5 illustrates the synchronization network 26 as sequentially arranged circuits whose operation is correlatable to the operational blocks given in FIG. 4B and to some of the operational blocks described with reference to FIG. 4A. More particularly, the matched filtering circuit 100 is correlatable to the operational block 88, the fast Fourier transform (FFT) circuit 102 has an operation of that of operational block 86, the power analyzer circuit 104 has an operation of that of operational block 98, and the operations of circuit 106 of synchronization network 26 is correlatable to that of operational block 96. The elements of synchronization network 26 are preferably implemented by a digital signal processor (DSP) integrated circuit or application specific integrated circuit (ASIC) having an addressable memory (not shown) that holds and stores information until needed. Further, each of the elements 100, 102, 104, and 106 are preferably accomplished by electronic means, such as a DSP/ASIC, performing a function and containing a routine which defines a complete sequence of instructions for performing the related operational blocks of FIGS. 4A and 4B so as to achieve the desired results described with reference to FIG. 4B.

As seen in FIG. 5, the matched filtering circuit 100 receives the stream of data from the analog-to-digital converter 20 via signal path 74. The matched filtering circuit 100 performs matched filtering selected to separate or strip the null and sine-sweep symbols from the stream of digital data of the A/D converter 20. The matched filtering circuit 100 provides the filtered waveforms of the null and sine-sweep symbols to the circuit 102 via signal path 110.

Circuit 102 performs a fast Fourier transform (FFT) on its received waveforms and provides an FFT carriers to the power analyzer 104 via signal path 112. As is known in the art, and as previously mentioned, the FFT carriers may be analyzed to determine the characteristics of the channel.

The power analyzer 104 checks the peak condition, within its assigned frequency domain, of its received FFT carriers and supplies a representative signal thereof to the timing for digital signal sampling circuitry 106, via signal path 114.

The timing circuit 106 provides for a timing signal that is routed to the master timer 24 via signal path 78. The timer (master timer) 24 operates so that the stream of data 36 applied to receiver elements of FIG. 1 are sampled at the proper time. The operation of the synchronizing network 26 allows for the circuit arrangement of FIG. 1 to acquire and maintain time synchronization so that the stream of data 36 transmitted by transmitter 12 may be properly accepted by the receiving elements of FIG. 1.

It should now be appreciated that the practice of the present invention provides for a synchronization network 26 that comprises a matched filter for a null symbol 54 which obtains a rough estimate of frame timing and a matched filter for the sine-sweep symbol 58 that obtains more precise frame timing information. The synchronization network 26, in cooperation with a differential encoding and decoding scheme, more fully described in U.S. patent application Ser. No. 08/574,095, provides for the proper timing information while reducing the complexity of the necessary computations, in particular, the elimination of an inverse fast Fourier transform (IFFT) normally performed by one of the receiver elements of the Eureka-147 system. The elimination of this computational requirement enhances the capability of the Eureka-147 system by reducing the complexity thereof.

It should be further appreciated that although the hereinbefore given description of the synchronization network has been primarily described for the Eureka-147 system, it should also be recognized that the principles of the present invention teach the use of a synchronization network that may be used in other types of digital signal processing systems.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The embodiments of the invention in which an exclusive property or privilege is claimed are defined as follows:

1. A method of time synchronizing a digital information receiving system with received digital information defined by a number of synchronization symbols including a predefined null symbol followed by a predefined sine-sweep symbol, followed by multiple adjacent data carriers transmitted simultaneously over a predetermined frequency range, wherein each of the multiple data carriers is modulated over time, comprising the steps of:

(1) detecting the null symbol and determining therefrom a first estimate of time to occurrence of the sine-sweep symbol;

(2) delaying the first estimate of time and thereafter match-filtering the digital information with a replica of the sine-sweep symbol to produce a matched filter output;

(3) determining a frequency at which the matched filter output has peak energy;

(4) converting the frequency at which the peak energy occurs to a time offset representing a second estimate of time to occurrence of the multiple adjacent carriers of the digital information; and (5) delaying the second estimate of time prior to processing the multiple adjacent data carriers to thereby time synchronize the digital information receiver with the received digital information.

2. The method of claim 1 wherein step (1) is performed using an envelope detecting technique.

3. The method of claim 2 wherein the envelope detecting technique includes the steps of:

(a) processing the null symbol and producing an amplitude envelope representative thereof;

(b) determining an absolute minimum value of the amplitude envelope and a time reference at which the absolute minimum value occurs; and (c) adding a predetermined time value to the time reference at which the absolute minimum value occurs to thereby provide the first estimate of time of occurrence of the sine-sweep symbol.

4. The method of claim 3 wherein the predetermined time value is equivalent to a known time period between the time reference and the time of occurrence of the sine-sweep symbol within the received digital information.

5. The method of claim 4 wherein the envelope detecting technique is one of a digital and an analog process.

6. The method of claim 1 wherein the matched filtering is accomplished by complex conjugate multiplication.

7. The method of claim 1 wherein step (3) includes the steps of:

(d) taking a Fourier transform of the matched filter output to produce a frequency domain energy distribution thereof; and (e) performing a peak energy search of the frequency domain energy distribution and determining therefrom a frequency at which the peak energy occurs.

8. The method of claim 1 wherein step (4) includes the steps of:

(f) determining a frequency difference between the frequency at which the peak energy occurs and a reference frequency; and (g) computing and inverse of the frequency difference to produce the time offset value.

9. The method of claim 8 wherein the reference frequency is equal to a frequency at which the matched filter output has peak energy when the sine-sweep symbol of the received digital information and the replica of the sine-sweep symbol are coincident in time.

10. The method of claim 1 wherein the information received by the digital information receiving system comprises information transmitted in accordance with known digital audio broadcasting techniques.

11. A network for time synchronizing a digital information receiving system with received digital information defined by a number of synchronization symbols including a predefined sine-sweep symbol, followed by multiple adjacent data carriers transmitted simultaneously over a predetermined frequency range, wherein each of the multiple data carriers is modulated over time, the system including a timer for controlling the rate at which the digital information is sampled, the network comprising:

- a matched filter including an input and an output, said matched filter being operable to receive the digital information at its input, compare the digital information with a replica of the sine-sweep symbol, and provide a corresponding filter signal at its output;

- means for transforming the filter signal to a frequency domain-energy distribution representation thereof;

- a power analyzer having an input and an output, said power analyzer being operable to receive the transformed signal at its input, determine a peak energy from the energy distribution thereof and corresponding frequency at which the peak energy occurs, and provide a frequency value equal to the frequency at which the peak energy occurs at its output; and

- means for converting the frequency value to a time offset value and providing the time offset value to the timer;

- wherein the timer is operable to adjust the rate at which the digital information is sampled in accordance with the time offset value to thereby synchronize the digital information receiving system with the received digital information.

12. The network of claim 11 wherein said matched filter compares the digital information with a replica of the sine-sweep symbol by complex-conjugate multiplication.

13. The network of claim 11 wherein said means for transforming the filter signal to a frequency domain-energy distribution representation thereof is a Fourier transform network.

14. The network of claim 11 wherein said means for converting the frequency value to a time offset value includes a network operable to determine a frequency difference equal to the difference between the frequency value and a reference frequency, and to invert the frequency difference to thereby produce the time offset value.

15. The network of claim 14 wherein the reference frequency is defined as a frequency at which the matched filter output has peak energy when the sine-sweep symbol of the received digital information and the replica of the sine-sweep symbol are coincident in time.

16. The network of claim 11 wherein the information received by the digital information receiving system comprises information transmitted in accordance with known digital audio broadcasting techniques.

17. The network of claim 11 wherein the received digital information is further defined by a null symbol preceding the sine-sweep symbol;

and wherein said matched filter is operable to first process the null symbol to provide a rough estimate of the rate at which the digital information is sampled, and thereafter process the sine-sweep symbol to provide an improved estimate of the rate at which the digital information is sampled.

* * * * *